US012795245B2

(12) United States Patent
Chou et al.

(10) Patent No.: US 12,795,245 B2
(45) Date of Patent: Nov. 10, 2026

(54) LIGHT-EMITTING DIODE (LED) FLICKER DETECTION IN HIGH DYNAMIC RANGE (HDR) IMAGES

(71) Applicant: CISTA SYSTEM CORP., Grand Cayman (KY)

(72) Inventors: Yang-Ting Chou, Zhubei City (TW); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 278 days.

(21) Appl. No.: 18/440,094

(22) Filed: Feb. 13, 2024

(65) Prior Publication Data

US 2025/0260903 A1 Aug. 14, 2025

(51) Int. Cl.
*H04N 23/745* (2023.01)
*G06T 7/246* (2017.01)

(52) U.S. Cl.
CPC ........... *H04N 23/745* (2023.01); *G06T 7/246* (2017.01); *G06T 2207/10144* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS 10,432,875 B2 * 10/2019 Nakamura ........... H04N 23/745
2007/0046790 A1 * 3/2007 Nakasuji ................ H04N 23/70 348/226.1
2011/0317028 A1 * 12/2011 Shinmei ................ H04N 23/88 348/226.1
2013/0258134 A1 * 10/2013 Ashida ................ H04N 23/745 348/223.1
2013/0271623 A1 * 10/2013 Jo ........................ H04N 25/589 348/226.1

* cited by examiner

*Primary Examiner* — Quan Pham
(74) *Attorney, Agent, or Firm* — Sheppard Mullin Richter & Hampton LLP

(57) ABSTRACT

This application describes method and apparatus for detecting LEDs and moving objects using spatially multiplexed image sensors. The sensor may include various pixel groups, each containing multiple pixels set to different exposure levels. Correspondingly, each frame captured reflects these diverse exposure settings. An example method involves extracting a vector of pixel intensities from a specific cluster of pixels in each frame, resulting in a collection of intensity vectors, one from each frame. These vectors are used to create a pattern that shows how the intensity varies across the series of frames. This intensity-changing pattern may be used to determine whether the cluster of pixels is recording a moving object or the flicker of an LED light source.

18 Claims, 9 Drawing Sheets

[Motion Pattern]

| | | | | | | | | | | | | | | |
|---|---|---|---|---|---|---|---|---|---|---|---|---|---|---|
| $L_0$ | 50 | 1023 | 1023 | 1023 | 1023 | 1023 | 1023 | 1023 | 1023 | 1023 | 1023 | 1023 | 1023 | 1023 |
| $L_1$ | 100 | 100 | 100 | 1023 | 1023 | 1023 | 1023 | 1023 | 1023 | 1023 | 1023 | 1023 | 1023 | 1023 |
| $L_2$ | 200 | 200 | 200 | 200 | 200 | 200 | 200 | 1023 | 1023 | 1023 | 1023 | 1023 | 1023 | 1023 |
| $L_3$ | 400 | 400 | 400 | 400 | 400 | 400 | 400 | 400 | 400 | 400 | 1023 | 1023 | 1023 | 1023 |

[LED Pattern]

| | | | | | | | | | | | | | | |
|---|---|---|---|---|---|---|---|---|---|---|---|---|---|---|
| $L_0$ | 100 | 100 | 100 | 100 | 100 | 100 | 100 | 100 | 100 | 100 | 100 | 100 | 100 | 100 |
| $L_1$ | 1023 | 1023 | 1023 | 1023 | 1023 | 1023 | 1023 | 1023 | 1023 | 1023 | 1023 | 1023 | 1023 | 1023 |
| $L_2$ | 100 | 100 | 100 | 100 | 100 | 100 | 100 | 100 | 100 | 100 | 100 | 100 | 100 | 100 |
| $L_3$ | 1023 | 1023 | 1023 | 1023 | 1023 | 1023 | 1023 | 1023 | 1023 | 1023 | 1023 | 1023 | 1023 | 1023 |

400 Original Vectors of pixel intensities

[Motion Pattern]

| | | | | | | | | | | | | | | |
|---|---|---|---|---|---|---|---|---|---|---|---|---|---|---|
| $L_{01}$ | 100 | 1023 | 1023 | 1023 | 1023 | 1023 | 1023 | 1023 | 1023 | 1023 | 1023 | 1023 | 1023 | 1023 |
| $L_{12}$ | 200 | 200 | 200 | 1023 | 1023 | 1023 | 1023 | 1023 | 1023 | 1023 | 1023 | 1023 | 1023 | 1023 |
| $L_{23}$ | 400 | 400 | 400 | 400 | 400 | 400 | 400 | 1023 | 1023 | 1023 | 1023 | 1023 | 1023 | 1023 |

[LED Pattern]

| | | | | | | | | | | | | | | |
|---|---|---|---|---|---|---|---|---|---|---|---|---|---|---|
| $L_{01}$ | 200 | 200 | 200 | 200 | 200 | 200 | 200 | 200 | 200 | 200 | 200 | 200 | 200 | 200 |
| $L_{12}$ | 1023 | 1023 | 1023 | 1023 | 1023 | 1023 | 1023 | 1023 | 1023 | 1023 | 1023 | 1023 | 1023 | 1023 |
| $L_{23}$ | 200 | 200 | 200 | 200 | 200 | 200 | 200 | 200 | 200 | 200 | 200 | 200 | 200 | 200 |

410 Alligned Vectors of pixel intensities

FIG. 4A

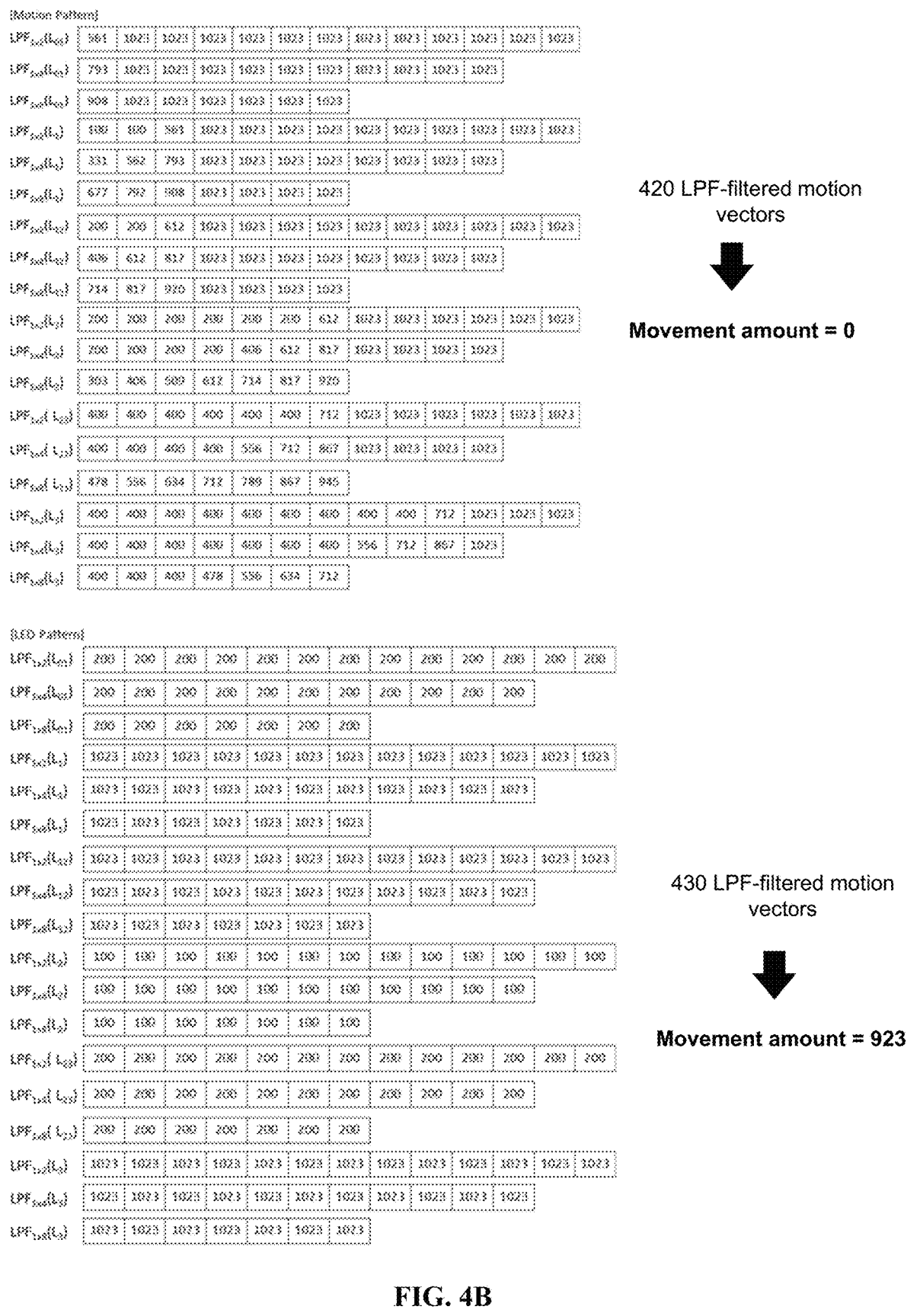

[Motion Pattern]

| | | | | | | | | | | | | | |
|---|---|---|---|---|---|---|---|---|---|---|---|---|---|
| LPF [illegible] | 561 | 1023 | 1023 | 1023 | 1023 | 1023 | 1023 | 1023 | 1023 | 1023 | 1023 | 1023 | 1023 |
| LPF [illegible] | 793 | 1023 | 1023 | 1023 | 1023 | 1023 | 1023 | 1023 | 1023 | 1023 | 1023 | | |
| LPF [illegible] | 908 | 1023 | 1023 | 1023 | 1023 | 1023 | 1023 | | | | | | |
| LPF [illegible] | 100 | 100 | 561 | 1023 | 1023 | 1023 | 1023 | 1023 | 1023 | 1023 | 1023 | 1023 | 1023 |
| LPF [illegible] | 331 | 562 | 793 | 1023 | 1023 | 1023 | 1023 | 1023 | 1023 | 1023 | 1023 | | |
| LPF [illegible] | 677 | 792 | 908 | 1023 | 1023 | 1023 | 1023 | | | | | | |
| LPF [illegible] | 200 | 200 | 612 | 1023 | 1023 | 1023 | 1023 | 1023 | 1023 | 1023 | 1023 | 1023 | 1023 |
| LPF [illegible] | 406 | 612 | 817 | 1023 | 1023 | 1023 | 1023 | 1023 | 1023 | 1023 | 1023 | | |
| LPF [illegible] | 714 | 817 | 920 | 1023 | 1023 | 1023 | 1023 | | | | | | |
| LPF [illegible] | 200 | 200 | 200 | 200 | 200 | 200 | 612 | 1023 | 1023 | 1023 | 1023 | 1023 | 1023 |
| LPF [illegible] | 200 | 200 | 200 | 200 | 406 | 612 | 817 | 1023 | 1023 | 1023 | 1023 | | |
| LPF [illegible] | 303 | 406 | 509 | 612 | 714 | 817 | 920 | | | | | | |
| LPF [illegible] | 400 | 400 | 400 | 400 | 400 | 400 | 712 | 1023 | 1023 | 1023 | 1023 | 1023 | 1023 |
| LPF [illegible] | 400 | 400 | 400 | 400 | 556 | 712 | 867 | 1023 | 1023 | 1023 | 1023 | | |
| LPF [illegible] | 478 | 556 | 634 | 712 | 789 | 867 | 945 | | | | | | |
| LPF [illegible] | 400 | 400 | 400 | 400 | 400 | 400 | 400 | 400 | 400 | 712 | 1023 | 1023 | 1023 |
| LPF [illegible] | 400 | 400 | 400 | 400 | 400 | 400 | 400 | 556 | 712 | 867 | 1023 | | |
| LPF [illegible] | 400 | 400 | 400 | 478 | 556 | 634 | 712 | | | | | | |

420 LPF-filtered motion vectors

↓

Movement amount = 0

[LED Pattern]

| | | | | | | | | | | | | | |
|---|---|---|---|---|---|---|---|---|---|---|---|---|---|
| LPF [illegible] | 200 | 200 | 200 | 200 | 200 | 200 | 200 | 200 | 200 | 200 | 200 | 200 | 200 |
| LPF [illegible] | 200 | 200 | 200 | 200 | 200 | 200 | 200 | 200 | 200 | 200 | 200 | | |
| LPF [illegible] | 200 | 200 | 200 | 200 | 200 | 200 | 200 | | | | | | |
| LPF [illegible] | 1023 | 1023 | 1023 | 1023 | 1023 | 1023 | 1023 | 1023 | 1023 | 1023 | 1023 | 1023 | 1023 |
| LPF [illegible] | 1023 | 1023 | 1023 | 1023 | 1023 | 1023 | 1023 | 1023 | 1023 | 1023 | 1023 | | |
| LPF [illegible] | 1023 | 1023 | 1023 | 1023 | 1023 | 1023 | 1023 | | | | | | |
| LPF [illegible] | 1023 | 1023 | 1023 | 1023 | 1023 | 1023 | 1023 | 1023 | 1023 | 1023 | 1023 | 1023 | 1023 |
| LPF [illegible] | 1023 | 1023 | 1023 | 1023 | 1023 | 1023 | 1023 | 1023 | 1023 | 1023 | 1023 | | |
| LPF [illegible] | 1023 | 1023 | 1023 | 1023 | 1023 | 1023 | 1023 | | | | | | |
| LPF [illegible] | 100 | 100 | 100 | 100 | 100 | 100 | 100 | 100 | 100 | 100 | 100 | 100 | 100 |
| LPF [illegible] | 100 | 100 | 100 | 100 | 100 | 100 | 100 | 100 | 100 | 100 | 100 | | |
| LPF [illegible] | 100 | 100 | 100 | 100 | 100 | 100 | 100 | | | | | | |
| LPF [illegible] | 200 | 200 | 200 | 200 | 200 | 200 | 200 | 200 | 200 | 200 | 200 | 200 | 200 |
| LPF [illegible] | 200 | 200 | 200 | 200 | 200 | 200 | 200 | 200 | 200 | 200 | 200 | | |
| LPF [illegible] | 200 | 200 | 200 | 200 | 200 | 200 | 200 | | | | | | |
| LPF [illegible] | 1023 | 1023 | 1023 | 1023 | 1023 | 1023 | 1023 | 1023 | 1023 | 1023 | 1023 | 1023 | 1023 |
| LPF [illegible] | 1023 | 1023 | 1023 | 1023 | 1023 | 1023 | 1023 | 1023 | 1023 | 1023 | 1023 | | |
| LPF [illegible] | 1023 | 1023 | 1023 | 1023 | 1023 | 1023 | 1023 | | | | | | |

430 LPF-filtered motion vectors

↓

Movement amount = 923

FIG. 4B

LIGHT-EMITTING DIODE (LED) FLICKER DETECTION IN HIGH DYNAMIC RANGE (HDR) IMAGES

TECHNICAL FIELD

The disclosure relates generally to apparatus, system, and method for detecting and mitigating LED flicker within HDR imagery.

BACKGROUND

In recent years, there has been a significant shift towards the utilization of pulse-width modulated (PWM) LED light sources in various applications, including vehicle headlights, traffic signs, billboards, and other illuminated signage. The adoption of PWM technology offers several advantages, such as energy efficiency and the ability to control brightness levels with precision. However, this technological advancement has introduced a critical challenge related to the synchronization of imaging sensors or cameras, such as those integrated into vehicles or security systems, with the frequency of PWM modulation employed by these LED sources.

The primary technical issue at hand is the occurrence of undesirable flicker artifacts in images and videos captured by these sensors and cameras when their exposure times are not synchronized with the PWM frequency of the LED light sources. These flicker artifacts manifest as rapid fluctuations in luminance, leading to visual discomfort, reduced image quality, and, in more severe cases, making it difficult for back-end object identification systems to effectively discern and identify the LED light sources within the imagery.

High Dynamic Range (HDR) imaging techniques have emerged as a solution to capture scenes with a wide range of luminance levels. HDR images typically involve the combination of long-exposure frames and multi-frame short-exposure frames to capture details in both bright and dim regions of a scene. One potential approach to mitigating LED flicker involves leveraging long-exposure information to compensate for the flicker effect. However, a fundamental challenge arises in distinguishing the precise location of the LED light source within the frame, as it often coincides with the position of moving objects or elements in the scene.

Attempting to apply long-exposure settings to the entire frame indiscriminately, in an effort to mitigate LED flicker, can result in undesirable side effects such as image blurriness and ghosting when capturing moving objects. Therefore, it becomes imperative to devise a robust and precise methodology to differentiate between those portions of HDR frames that encompass the LED light source and those encompassing moving objects. Subsequently, distinct exposure settings can be applied to these segments of the HDR imagery, enabling the generation of optimal HDR images that effectively eliminate LED flicker artifacts while maintaining image clarity and quality.

This application describes a novel solution for detecting and mitigating PWM LED flicker within HDR imagery. Such a solution would not only enhance the overall user experience in various applications but also advance the capabilities of vision-based technologies across multiple domains.

SUMMARY

Various embodiments of this specification may include hardware circuits, systems, and methods for detecting and mitigating LED flicker within HDR imagery.

In some aspects, the techniques described in this context revolve around an image processing method to distinguish moving objects from Light-Emitting Diode (LED) flickers in an image based on the pixel intensity-changing patterns.

In some embodiments, the method may include capturing a plurality of frames of a scene using a spatially multiplexed image sensor. The spatially multiplexed image sensor comprises a plurality of pixel groups, each pixel group comprises a plurality of pixels with a plurality of different exposure settings, and the plurality of frames respectively corresponds to a plurality of different exposure settings. The method may further include obtaining a plurality of vectors of pixel intensities respectively from the plurality of frames, each of the plurality of vectors of pixel intensities corresponding to a cluster of pixels in one of the plurality of frames; generating an intensity-changing pattern for the cluster of pixels across the plurality of frames based on the plurality of vectors of pixel intensities; and determining, based on the intensity-changing pattern, whether the cluster of pixel captures a moving object or an LED light source.

In some embodiments, the plurality of different exposure settings correspond to linearly increased exposure times by a predetermined factor.

In some embodiments, the generating the intensity-changing pattern for the cluster of pixels across the plurality of frames based on the plurality of vectors of pixel intensities includes: performing pixel intensity alignment among the plurality of vectors of pixel intensities by using the predetermined factor, thereby obtaining a plurality of vectors of aligned pixel intensities.

In some embodiments, the performing pixel intensity alignment among the plurality of vectors of pixel intensities by using the predetermined factor includes: for a first vector of pixel intensities corresponding to a shorter exposure setting, enhancing the first vector of pixel intensities by the predetermined factor to align with a second vector of pixel intensities corresponding to a longer exposure setting.

In some embodiments, the generating the intensity-changing pattern for the cluster of pixels across the plurality of frames based on the plurality of vectors of pixel intensities further includes: applying a plurality of low pass filters (LPFs) to the plurality of vectors of aligned pixel intensities and the plurality of vectors of pixel intensities to quantify pixel intensity changes among the plurality of frames; and determining the intensity-changing pattern based on these quantified pixel intensity changes among the plurality of frames.

In some embodiments, the plurality of LPFs have linearly increased window sizes.

In some embodiments, the determining whether the cluster of pixels capture a moving object or an LED light source based on the intensity-changing pattern includes: in response to the intensity-changing pattern indicating a gradual changing pattern, determining that the cluster of pixels capture the moving object; and in response to the intensity-changing pattern indicating a fluctuating pattern, determining that the cluster of pixels capture the LED light source.

In some embodiments, the determining whether the cluster of pixels capture a moving object or an LED light source based on the determined intensity-changing pattern includes: generating a motion amount based on the determined intensity-changing pattern; in response to the motion amount being greater than a first threshold, determining that the cluster of pixels capture the LED light source; and in response to the motion amount being smaller than a second threshold, determining that the cluster of pixels capture the moving object.

In some embodiments, the method may further include: in response to determining that the cluster of pixels capture the LED light source, performing LED Flicker Mitigation (LFM) on the cluster of pixels across the plurality of frames; and in response to determining that the cluster of pixels capture the moving object, performing HDR fusion on the cluster of pixels across the plurality of frames.

In some embodiments, the performing LFM on the cluster of pixels across the plurality of frames includes: for the cluster of pixels, adopting corresponding pixel intensities captured using a longest exposure time in the plurality of different exposure settings.

In some embodiments, the method may further include: in response to the motion amount being between the first threshold and the second threshold, performing partial LFM and partial HDR fusion on the cluster of pixels across the plurality of frames.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIGS. 4A and 4B illustrate a comparison of different pixel intensity patterns for LED flickers and moving objects, according to some embodiments of this specification.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown, but is to be accorded the widest scope consistent with the principles and features disclosed herein.

When using cameras or image sensors to capture a scene that involves both LED light sources and moving objects, the pixels corresponding to the LED light sources and the moving objects may have changing pixel brightnesses (or called pixel intensities) at different time points. This is because LED light sources may cause LED flickers, resulting in fluctuations in pixel intensities, while moving objects may gradually change position, causing varying pixel brightness values.

This application harnesses the distinct pixel intensity patterns associated with LED flickers and moving objects to effectively differentiate the pixels covering the LED sources from those covering the moving objects. Subsequently, different image processing methods can be applied to these distinct groups of pixels to generate optimal High Dynamic Range (HDR) images, preserving both the details of the moving objects and the vibrant illumination provided by the LED light sources.

Figure 1A:
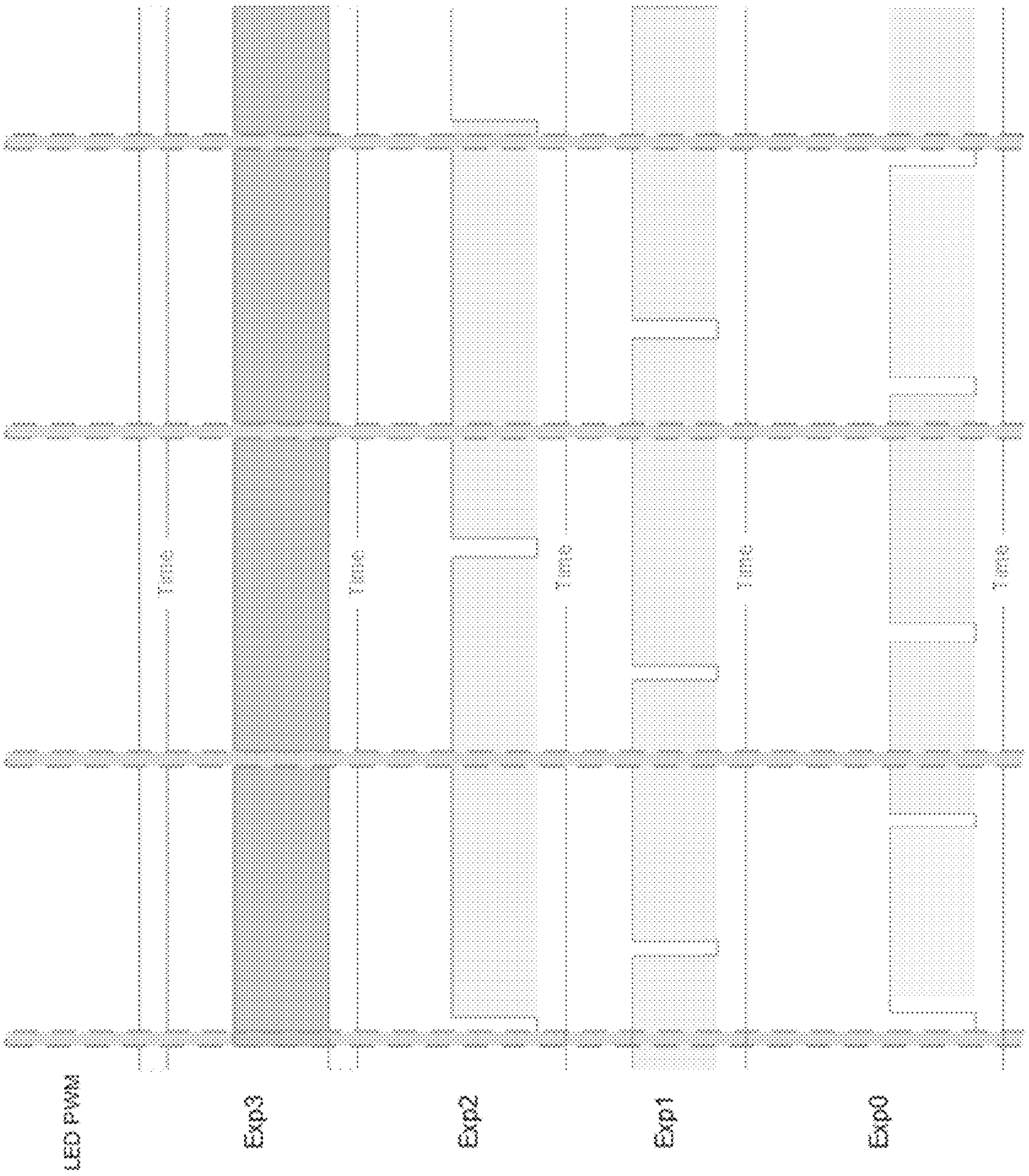
FIG. 1A illustrates capturing a scene of LED light source (s) using an image sensor with different exposure settings.

FIG. 1A illustrates capturing a scene of LED light source(s) using an image sensor with different exposure settings. As explained in the background section, flickering is a common occurrence in LED light sources, such as traffic signals and signboards, due to their repetitive ON/OFF cycles. These fluctuations in light intensity, although not visible to the human eye, can be detected by sensors designed to pick up such flickers. When exposed to these fluctuations, sensors may incorrectly interpret the working condition of LED light sources, adversely affecting the performance of embedded vision systems.

For example, autonomous vehicles rely on cameras to detect and interpret traffic signals, including those illuminated by LED lights; many urban areas now use LED streetlights for energy efficiency. Autonomous vehicles navigating roads at night encounter different street lighting conditions, including flickering LED lights.

Surveillance cameras in public places like airports, train stations, and shopping malls might encounter flickering LED lights from various sources, such as display panels, advertising boards, or decorative lighting. Modern sports arenas use LED lighting systems for energy efficiency. Cameras capturing live sports events need to contend with the flickering caused by these LED lights.

As shown in FIG. 1A, the LED Pulse Width Modulation (PWM) has ON/OFF cycles. An image sensor with a long exposure time (e.g., Exp3) has a better chance to capture more ON cycles of the LED light source, yielding a more accurate representation of the light source's true operational state. Conversely, another image sensor with a shorter exposure time (e.g., Exp2 or Exp0) may miss some of the On cycles of the LED light source, leading to an inconsistent depiction of the LED's illumination. In other words, setting a longer exposure time allows the sensor to collect light over an extended period, increasing the probability of capturing more ON cycles of the LED. This results in a more stable and continuous illumination representation in the captured image.

However, despite the advantages of longer exposure times, there are disadvantages to consider. Longer exposures lead to the sensor capturing more light, potentially causing overexposure. Overexposed images lose details in bright areas, significantly impacting image quality. Moreover, in environments with varying light sources, longer exposures might introduce motion blur or capture unintended light sources, further complicating the image capture process. Given these practical limitations, relying solely on longer exposure times for LED LFM purposes is not practical.

Figure 1B:
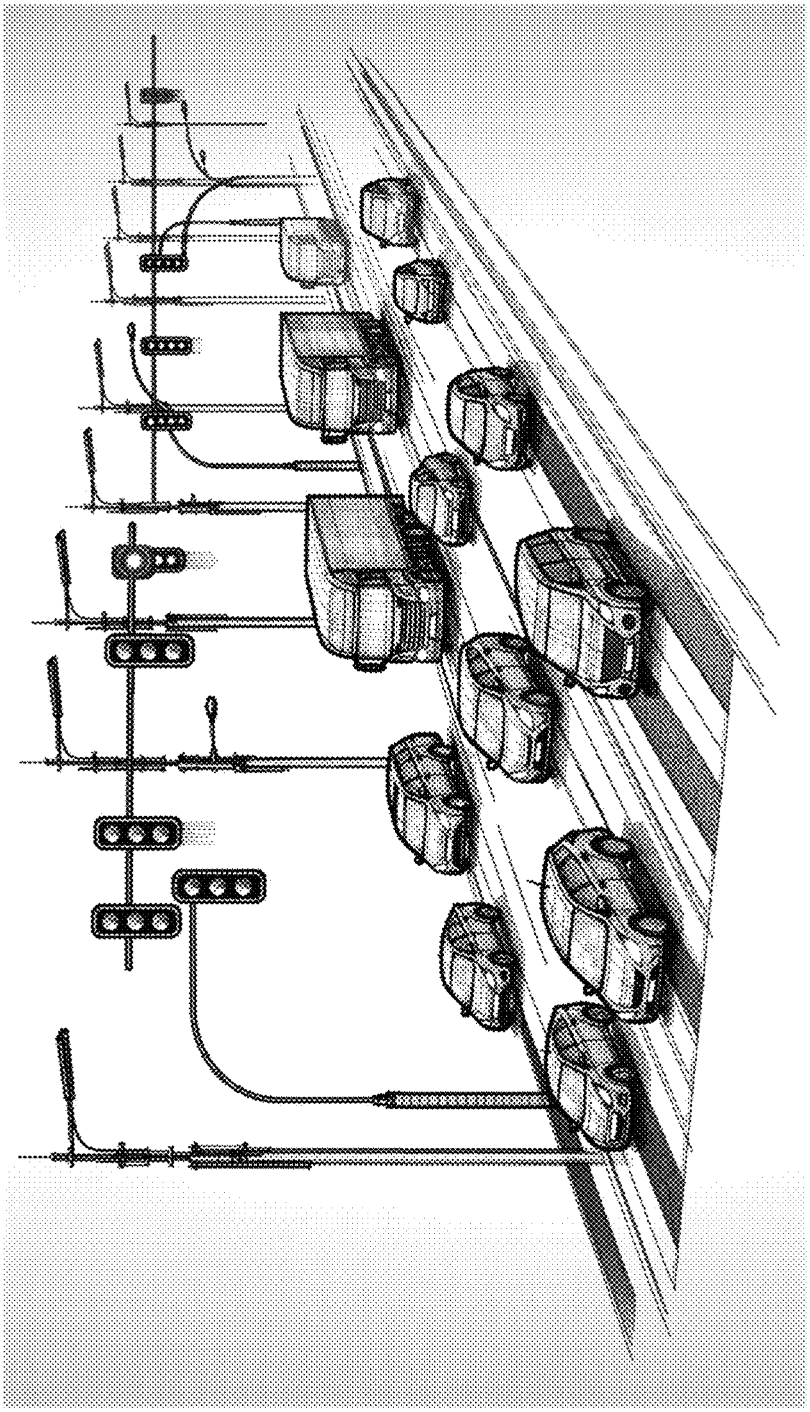
FIG. 1B illustrates a real-world scenario where LED flickering coincides with the presence of moving objects, presenting a formidable challenge for on-vehicle monitoring cameras or surveillance cameras in their endeavor to produce the most effective HDR images.

FIG. 1B illustrates a real-world scenario where LED flickering coincides with the presence of moving objects, presenting a formidable challenge for on-vehicle monitoring cameras or surveillance cameras in their endeavor to produce the most effective HDR images.

As explained in the background section, capturing a scene with both LED light sources and moving objects presents a unique set of challenges for image sensors due to the presence of LED flickers and the motion of objects. In particular, the combination of LED flickers and moving objects results in two sources of pixel brightness variations occurring simultaneously. Image sensors need to differentiate between these variations caused by LED flickers and those caused by moving objects to effectively capture the scene. This necessitates advanced algorithms and image processing techniques that can analyze the temporal patterns of pixel intensity changes and attribute them to their respective sources. Addressing these challenges is crucial to ensuring that images captured in such scenarios accurately represent both the LED light sources and the moving objects within the scene, ultimately leading to high-quality results.

FIG. 1B illustrates a traffic scene as just one typical scenario where LED light sources and moving objects interact. Other examples could include a warehouse equipped with LED lighting, where carts and objects are in constant motion, or a stadium bathed in the glow of intense LED floodlights during evening sports events.

In all these scenarios, it's crucial for monitoring cameras and video systems to effectively distinguish between LED light sources and moving objects. This distinction is essential for the accurate application of LED Flicker Mitigation (LFM) or High Dynamic Range (HDR) fusion techniques, ensuring clear and precise visual capture in environments where LED lighting and movement coexist.

Figure 1C:
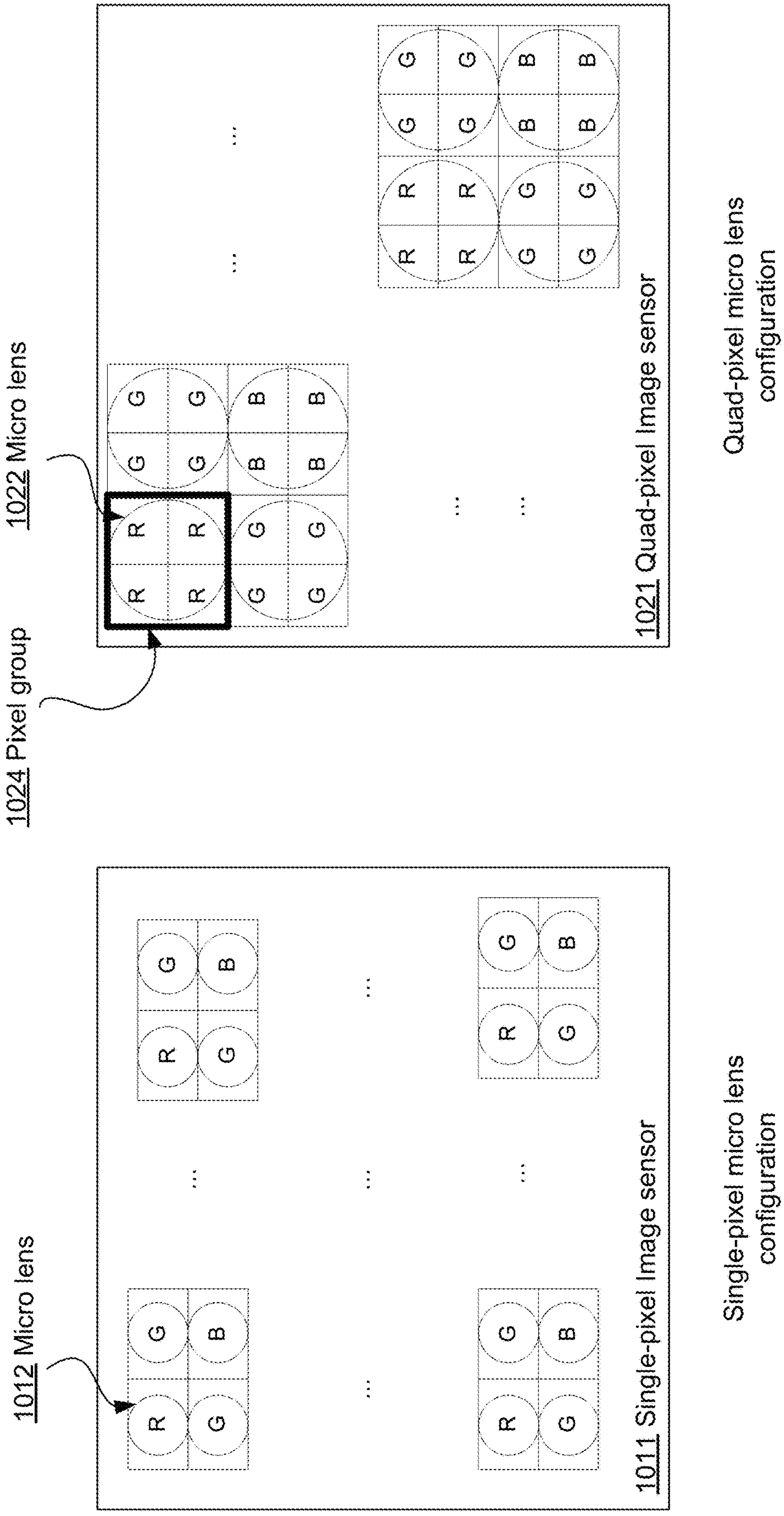
FIG. 1C illustrates exemplary spatially multiplexed image sensors, according to some embodiments of this specification.

The method described in this application utilizes spatially multiplexed image sensors or other types of image sensors capable of capturing the same scene with multiple frames of different exposure settings. FIG. 1C illustrates exemplary spatially multiplexed image sensors, according to some embodiments of this specification. A spatially multiplexed image sensor may have a matrix of pixels in a group. A common example is quad-pixel image sensor with quad-pixel units, also called quadruple (or quad), each of which includes four pixels arranged in a square or rectangular pattern.

In some embodiments, the pixels within the same group capture the different colors (using different color filters), such as the single-pixel image sensor 1011. In some embodiments, the pixels within the same group capture the same color (using the same color filters), such as the quad-pixel image sensor 1021.

Each spatially multiplexed image sensor may include a plurality of microlenses covering the pixels. A microlens is a small lens designed to focus light onto a corresponding pixel beneath it. The size of a microlens may vary, particularly in high-resolution sensors with small pixel dimensions, and can be on the order of a few micrometers (μm) to align with the scale of the pixels it serves. A typical microlens may be a single element with one flat surface and one curved (e.g., spherical convex or other shapes) surface to refract the light. The plurality of microlenses are sometimes arranged as an array, such as a one-dimensional or two-dimensional array on a supporting substrate. Single micro-lenses may be used to couple light to the covered pixels or photodiodes; microlens arrays may be used to increase the light collection efficiency of CCD or CMOS image sensors, to collect and focus light that would have otherwise fallen onto the non-sensitive areas of the sensors.

Different spatially multiplexed image sensors may have different microlens configurations for each pixel group. FIG. 1C illustrates a single-pixel microlens configuration in the image sensor 1011, and a quad-pixel microlens configuration in the image sensor 1021. In the single-pixel microlens configuration, the pixels in the image sensor 1011 are respectively covered by microlenses 1012 for coupling lights to the covered pixels. In contrast, in the quad-pixel microlens configuration, one microlens 1022 is configured to cover a two-by-two matrix of pixels 1024 (also called a pixel group), and the pixels in the pixel group 1024 are covered with color filters of the same color.

The following figures and descriptions introduce the LFM method using a spatially multiplexed image sensor. For simplicity, the LFM method assumes that the spatially multiplexed image sensor can have different exposure configurations at pixel-level, regarding less how the pixels or microlenses are configured.

Note that the term "pixels" in this description may have different meaning depending on the context. When the term "pixels" refers to the basic physical elements in an image sensor, it may be understood as sensor pixels, photosites, or CCD or CMOS sensors. Each of such physical pixel in the sensor is a photodetector that captures light photons.

The term "pixels" may also be used to refer to the smallest unit of a digital image displayed on screens like computer monitors, TVs, or smartphone displays. Each pixel in an image represents a specific color and brightness at a specific point in the image. A person skilled in the art reading this application would appreciate when the term "pixels" are (1) physical components that capture light and convert it into electrical signals, forming the raw data for an image, or (2) elements of a screen that render this data visually as part of a digital image.

Figure 2:
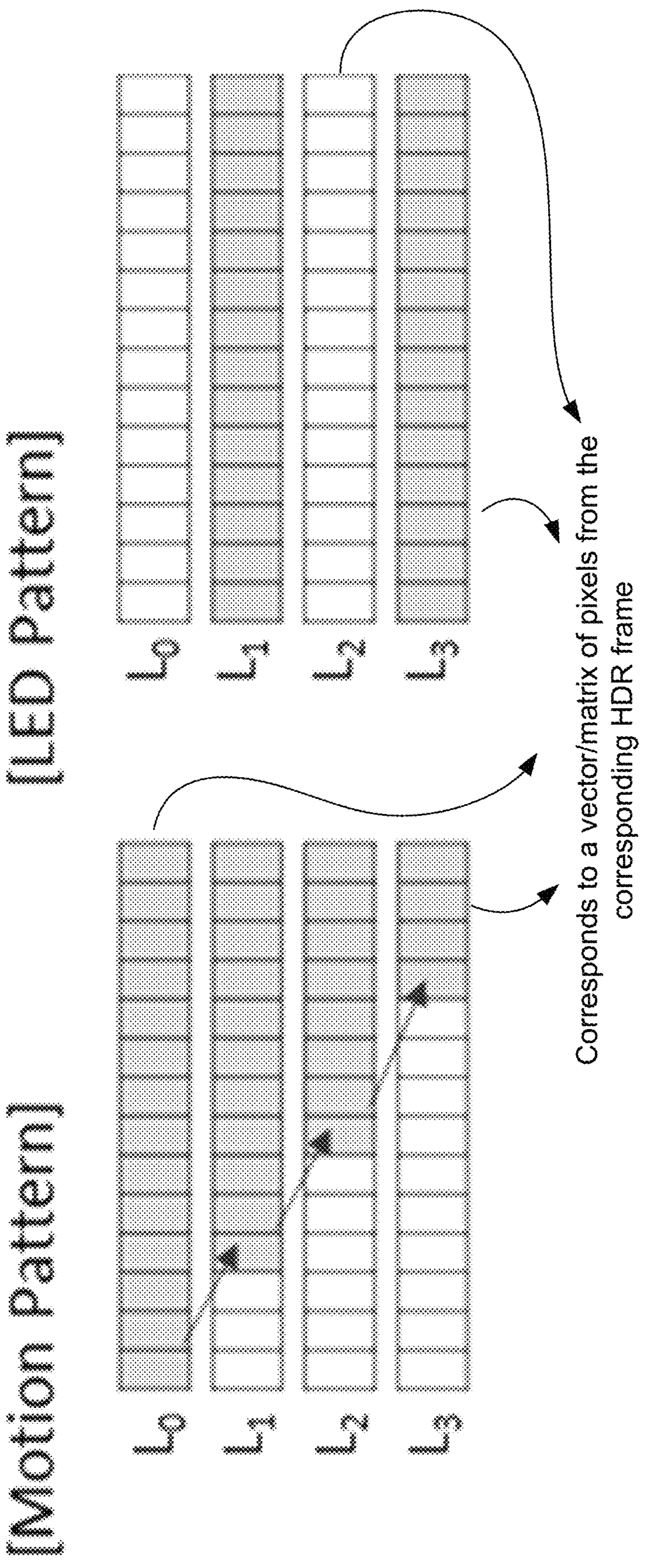
FIG. 2 illustrates different pixel intensity patterns respectively corresponding to a moving object and an LED light source, according to some embodiments of this specification.

FIG. 2 illustrates different pixel intensity patterns respectively corresponding to a moving object and an LED light source, according to some embodiments of this specification.

When a spatially multiplexed image sensor is used to capture a scene (such as the quad-pixel image sensor illustrated in FIG. 1C), the multiple pixels within the same pixel group may be configured with different exposure times (e.g., from short exposure to long exposure) to capture multiple frames of the same scene. The pixels using the same exposure setting across all pixel groups may form one HDR frame. These frames may be referred to as HDR frames or exposure bracketed frames.

As an example shown in FIG. 2, a quad-pixel image sensor uses four different exposure settings (L0, L1, L2, and L3 within the same quadruple) to capture a scene.

The four exposure settings respectively generate four HDR frames. Each of the vectors in FIG. 2 represent a vector (or a matrix) of pixels from one HDR frame, and each value in the vectors represents a pixel intensity value (e.g., brightness).

As illustrated by the motion patterns in FIG. 2, when an object is in motion (as captured in a moving motion), the pixel intensities of the object under varying exposure settings (ranging from a shorter exposure L0 to a longer exposure L3) can exhibit a progressively altering pattern, known as a motion vector. For instance, in FIG. 2's motion pattern, the count of dark pixels incrementally increases with longer exposure times from L0 to L3. Conversely, when capturing an LED light source under these varying exposures, the pixel response is distinctly different. The pixels either entirely capture the LED's ON cycle (resulting in all pixels being illuminated), or they capture the OFF cycle (leading to all pixels appearing dark). Consequently, the pixel intensity pattern associated with the LED light source resembles a cyclical fluctuation; for example, in FIG. 2's LED pattern, the L0 vector is entirely dark, while the L1 vector is fully bright. This indicates that the motion energy of pixels capturing the LED light source is significantly higher than that of pixels capturing a moving object.

In the course of experiments, the inventors discovered that basing the identification of motion vectors solely on the intensities of individual pixels often leads to oversensitivity and can result in errors due to outlier data. To mitigate this problem, a pyramid structure was introduced, designed to reduce impulse noise through the application of multiple layers of low pass filters (LPFs). These LPFs vary in their approach, encompassing options such as mean filters of different window sizes or filters with varying coefficients. The implementation of LPFs is adaptable to both hardware and software environments, allowing flexibility based on the specific requirements of the application and the capabilities of the processing platform.

In this design, LPFs are crucial in enhancing motion vector detection by effectively reducing high-frequency noise and smoothing out outliers, thus mitigating oversensitivity and errors. For example, the adoption of the LPFs makes it easier for algorithms to discern and analyze motion patterns by averaging pixel values and reducing the impact of extreme fluctuations. This results in stabilized motion vector calculations and minimizes aliasing effects, which can occur in digital imaging. Moreover, LPFs contribute to the computational efficiency of the system, particularly valuable in real-time processing scenarios, by filtering out unnecessary details and reducing the overall processing load.

Figure 3:
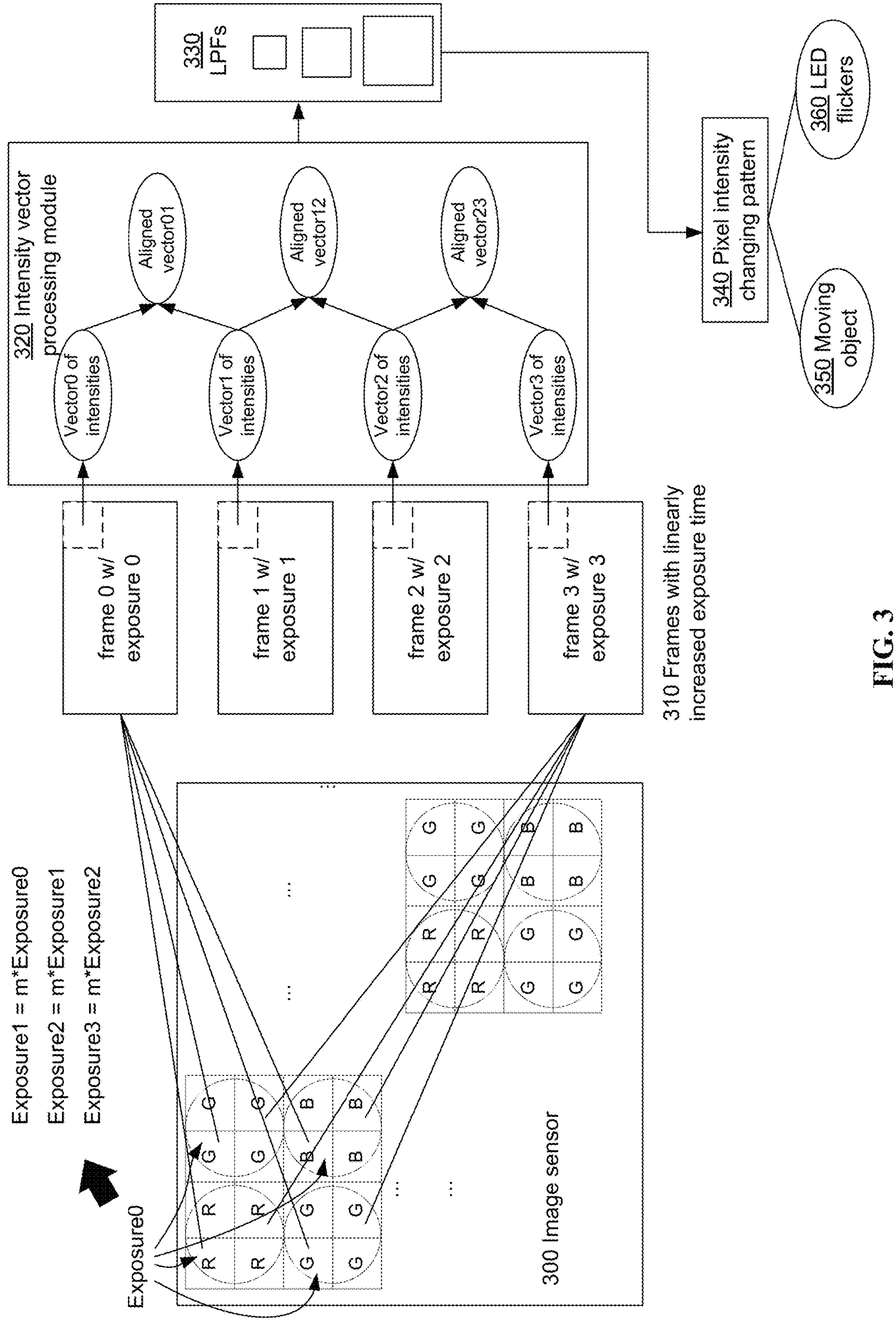
FIG. 3 illustrates a system diagram for detecting LED flickers and moving objects within HDR imagery using low pass filters (LPFs), according to some embodiments of this specification.

FIG. 3 illustrates a system diagram for detecting LED flickers and moving objects within HDR imagery using LPFs, according to some embodiments of this specification. The quad-pixel image sensor 300 in FIG. 3 is used as an example for illustration purposes. A person skilled in the art would easily transform the process for other types of spatially multiplexed image sensors, e.g., each quadruple with pixels covered by different color filters, or each pixel group with six or eight pixels, etc.

As shown, the quad-pixel image sensor 300 includes a plurality of quadruples, each with four pixels. In some embodiments, the LFM method may start with configuring the pixels within each quadruple with linearly increased exposure settings, i.e., the exposure time for each pixel in the same quadruple increases linearly, with the common ratio denoted as m (e.g., assuming L0 is the shortest exposure, L1 is m times L0, etc.). For example, all top-left pixels from all quad-pixel quadruples in the image sensor are configured with a short exposure time such as 1/500 seconds (2 milliseconds), denoted as Exposure0 in FIG. 3; the top-right pixels from all quad-pixel quadruples in the image sensor are configured with Exposure1=m*Exposure0; the bottom-left pixels from all quad-pixel quadruples in the image sensor are configured with Exposure2=m*Exposure1=m*m*Exposure0; and the bottom-right pixels from all quad-pixel quadruples in the image sensor are configured with Exposure3=m*Exposure2=m*m*Exposure1=m*m*m*Exposure0. The value of the common ratio, i.e., the exposure increasing rate among the pixels within the same quadruple, may be a fixed integer or floating number that is greater than one. The selection of the common ratio should avoid causing overexposure at the pixel with the greatest exposure time in each quadruple. The selected common ratio may be the same for all quadruples in the same image sensor.

Using this configured image sensor to capture a scene with one or more LED light sources, the pixels from the same pixel position across the plurality of quadruples (i.e., the pixels across the plurality of quadruples with the same exposure settings) will produce one frame of the scene using the particular exposure configuration. This way, the quad-pixel image sensor produces four frames 310 in total.

The four frames 310 may then be fed into an intensity vector processing module 320 for detecting LED flickers and/or moving objects. In some embodiments, a cluster of pixels (e.g., a vector or a matrix of contiguous pixels) may be selected from the same location of each of the frames, and the pixel intensities of the selected clusters of pixels may be obtained. As shown in FIG. 3, vector0 of pixel intensities represents the pixel intensities of the selected cluster of pixels from the frame 0, vector1 of pixel intensities represents the pixel intensities of the selected cluster of pixels from the frame 1, and so on.

These pixel intensity vectors can be utilized to create an intensity-changing pattern across a cluster of pixels over multiple frames. This pattern reflects the variations in brightness of these pixels as they capture the same scene under different exposure times. A lack of change in the intensity pattern might suggest that the pixel cluster is capturing a static scene, meaning there are no LED flickers or moving objects. On the other hand, if the pattern shows a gradual shift in brightness, such as an increasing or decreasing number of dark pixels (as depicted in the 'motion pattern' in FIG. 2), it could indicate that the pixel cluster is recording a moving object. Conversely, a fluctuating pattern, characterized by a significant number of contiguous pixels alternating between completely dark and completely bright states, could signify that the pixel cluster is detecting LED flickers.

In some embodiments, the intensity vector processing module 320 may first perform pixel intensity alignment among the plurality of vectors of pixel intensities. For instance, assuming the exposure time increases among the pixels within the same quadruple, the exposure time increasing factors may be used to align a first vector of a first exposure time towards a second vector of a second exposure time, where the second exposure time is longer than the first exposure time. For instance, the alignment may include scaling the first vector of pixel intensities by the predetermined factor to align with a second vector of pixel intensities corresponding to a longer exposure setting. Formulas (1)-(3) illustrate an example of aligning a pixel intensity vector of a shorter exposure towards a pixel intensity vector of a next longer exposure.

$$L_{01} = L_0 \times m_{01} \quad (1)$$

$$L_{12} = L_1 \times m_{12} \quad (2)$$

$$L_{23} = L_2 \times m_{23} \quad (2)$$

where L0 represents the pixel vector of the shortest exposure, L1 represents the pixel vector of the next exposure longer than L0, L2 presents the pixel vector of the next exposure longer than L1, $m_{01}$ represents the exposure increasing factor between L0 and L1, $m_{12}$ represents the exposure increasing factor between L1 and L2, and $m_{23}$ represents the exposure increasing factor between L2 and L3. $L_{01}$ represents the aligned version of vector Lotowards $L_1$, $L_{12}$ represents the aligned version of vector L1 towards $L_2$, $L_{23}$ represents the aligned version of vector $L_2$ towards $L_3$. In some embodiments, $m_{01}$, $m_{12}$, $m_{23}$ may be the same (e.g., the exposure settings within a quadruple are linearly increased), ensuring a uniform progression of exposure increments across the image sensor. By normalizing the pixel intensities in this way, the system can accurately interpret the intensity changes, facilitating the distinction between patterns indicative of moving objects and those of LED flickers.

In some embodiments, a group of LPFs 330 may be applied to the original vectors of pixel intensities and the aligned vectors of pixel intensities to quantify the pixel brightness changes (e.g., movement) of the cluster of pixels among the plurality of frames. This step is crucial for quantifying the changes in pixel brightness, which may indicate motion within the cluster of pixels across the captured frames. The group of LPFs 330 may reduce high-frequency noise and smooth out the pixel intensity changes between contiguous pixels in the frames, thereby mitigating oversensitivity and errors. In some embodiments, the LPFs have linearly increasing window sizes (also called kernel sizes), forming a pyramid shape of filters. This pyramid structure allows for the progressive smoothing of pixel intensity variations, with each level of the pyramid corresponding to a different scale of detail.

There are different ways to apply the pyramid of LPFs 330 to the pixel intensity vectors for obtaining the pixel intensity-changing patterns. For instance, a threshold-based approach may be implemented using the LPFs to search for moving objects between different exposures. Each LPF may be applied to the aligned vectors of pixel intensities and the corresponding original vector of pixel intensities to determine a smallest amount of pixel intensity changes. Formulas (4)-(12) are used as examples to show how to apply three LPFs (size of 1×2, 1×4, and 1×8) to the vectors in the intensity vector processing module 320 as shown in FIG. 3:

$$D_{2,01}=\min\{|LPF_{1\times2}(L_{01}(i))-LPF_{1\times2}(L_1(j))|\} \tag{4}$$

$$D_{2,12}=\min\{|LPF_{1\times2}(L_{12}(i))-LPF_{1\times2}(L_2(j))|\} \tag{5}$$

$$D_{2,23}=\min\{|LPF_{1\times2}(L_{23}(i))-LPF_{1\times2}(L_3(j))|\} \tag{6}$$

$$D_{4,01}=\min\{|LPF_{1\times4}(L_{01}(i))-LPF_{1\times4}(L_1(j))|\} \tag{7}$$

$$D_{4,12}=\min\{|LPF_{1\times4}(L_{12}(i))-LPF_{1\times4}(L_2(j))|\} \tag{8}$$

$$D_{4,23}=\min\{|LPF_{1\times4}(L_{23}(i))-LPF_{1\times4}(L_3(j))|\} \tag{9}$$

$$D_{8,01}=\min\{|LPF_{1\times8}(L_{01}(i))-LPF_{1\times8}(L_1(j))|\} \tag{10}$$

$$D_{8,12}=\min\{|LPF_{1\times8}(L_{12}(i))-LPF_{1\times8}(L_2(j))|\} \tag{11}$$

$$D_{8,23}=\min\{|LPF_{1\times8}(L_{23}(i))-LPF_{1\times8}(L_3(j))|\} \tag{12}$$

where $LPF_{a*b}$ represents the LPF with a size of a*b, and $D_{b,de}$ represents the smallest pixel intensity changes between the aligned vector $L_d$ and the original vector $L_e$ with a window size b. The LPFs have a pyramid shape structure (from 1×2, to 1×4, and then 1×8).

After obtaining these pixel intensity changes between vectors, the maximum value among them may be selected as the intensity-changing pattern 340 (in this approach, the "intensity-changing pattern" is represented by a number, i.e., the amount of pixel intensity changes).

Subsequently, the intensity-changing pattern 340 may be used to determine a probability of the cluster of pixels capturing a moving object 350, LED flickers 360, or a static scene.

For example, two thresholds may be used to determine the probability, as shown in formula (14):

$$wt_{LFM}=\begin{cases}1 & \text{if } mt\geq Th_1\\ 0 & \text{, if } mt\leq Th_0\\ 1\times(mt-Th_0)\times\text{Slope} & \text{else}\end{cases} \tag{14}$$

there $Th_1$ is a higher threshold than $Th_0$, and the term "slope" represents a linear relationship between $Th_0$ and $Th_1$. Formula (14) indicates that if the amount of pixel intensity changes is greater than the first threshold, it means that the cluster of pixels capture an LED flickers; if the amount of pixel intensity changes is smaller than the second threshold, it means that the cluster of pixels capture a moving object; and if the amount of pixel intensity changes is between the first and the second thresholds, it may imply that the cluster of pixels capture a mixed of LED flickers or moving object. The output of formula (14) is $wt_{LFM}$, representing how likely to apply LFM or HDR fusion to the cluster of pixels.

In some embodiments, if the cluster of pixels capture LED flickers 360 (e.g., $wt_{LFM}=1$), LED flicker mitigation (LFM) technique may be used to retain the ON cycles of the LED light source (e.g., by adopting the pixel intensities captured under the longest exposure time). If the cluster of pixels capture a moving object (e.g., $wt_{LFM}=0$), HDR fusion techniques may be applied. If $0<wt_{LFM}<1$, partial LFM and partial HDR fusion may be performed on the cluster of pixels across the plurality of frames to determine the final pixel intensities. As an example, formula (15) may be used to generate the final pixel intensities for the cluster of pixels:

$$L_{final}=wt_{LFM}\times L_3+(1-wt_{LFM})\times L_{fusion} \tag{15}$$

where $L_3$ represents the vector of pixel intensities under the longest exposure time, $L_{fusion}$ represents the vector of pixel intensities after HDR fusion, and $L_{final}$ represents the final pixel intensities for the cluster of pixels.

The system diagram in FIG. 3A shows one cluster of pixels from the multiple frames as an example. In a practical application, the frames may each be divided into a plurality of clusters of pixels, and the process illustrated in FIG. 3A may be performed against all the clusters of pixels in parallel. During this process, some clusters of pixels may go through LFM, some clusters of pixels may go through HDR fusion, and some clusters of pixels may go through partial LFM and partial HDR fusion. The output of the process is a final image generated from the multiple frames, in which the pixels covering LED flickers have the pixel intensities captured under the longest exposure time, the pixels covering moving objects and static scenes have pixel intensities generated from HDR fusion, and the pixels covering both LED flickers and moving objects have pixel intensities generated from partial LFM and partial HDR fusion.

FIGS. 4A and 4B illustrate a comparison between different pixel intensity patterns for LED flickers and moving objects, as described in some embodiments of this specification. In this particular example, the initial pixel intensity vectors, labeled 400, represent the values from a selected pixel cluster across several HDR frames, capturing a scene that includes both LED lighting and moving objects.

As an initial step, these original vectors 400 undergo a process of pixel intensity enhancement. This enhancement involves aligning vectors from shorter exposure times with those from longer exposure times. The result of this enhancement is a set of aligned pixel intensity vectors, denoted as 410. It's important to note that the count of these aligned vectors 410 is one fewer than the original vectors 400. This is because the vectors associated with the longest exposure time do not undergo the enhancement step.

Subsequently, the process involves applying Low Pass Filters (LPFs) of various window sizes to both the original 400 and aligned 410 vectors of pixel intensities. This step yields multiple LPF-filtered (smoothed) motion vectors, identified as 420 and 430. As depicted in FIG. 4B, the LPF-filtered motion vectors 420 related to moving objects display smoother transitions, while those corresponding to LED flickers show more fluctuating value changes.

By quantifying these value changes in the LPF-filtered motion vectors 420 and 430 in terms of movement magnitude, it becomes possible to discern whether the pixel cluster is capturing LED flickers or a moving object. This determination is crucial in deciding whether to apply LED Flicker mitigation (LFM), High Dynamic Range (HDR) fusion, or a combination of both, in order to produce the final HDR image from the collected HDR frames.

Figure 5:
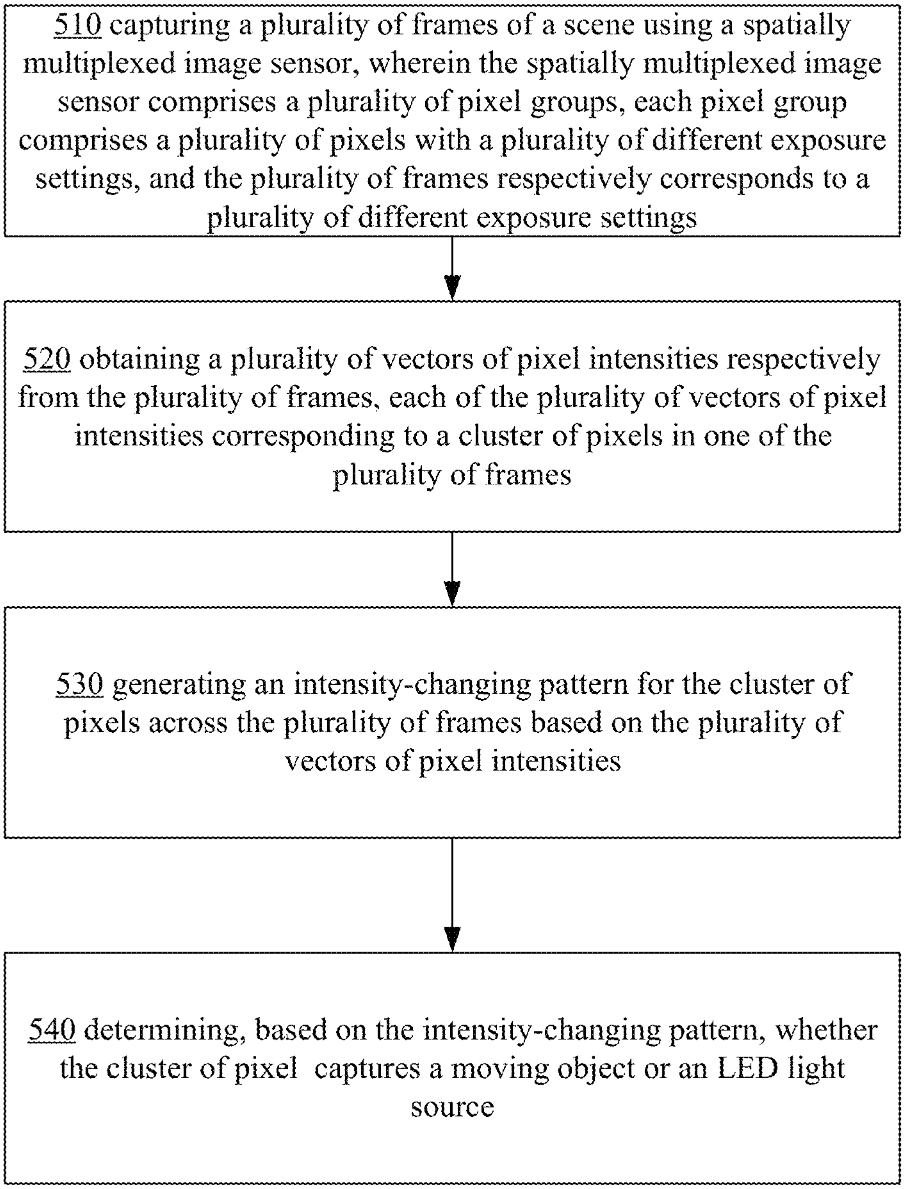
FIG. 5 illustrates an exemplary method for detecting LED flickers and moving objects within HDR imagery, according to some embodiments of this specification.

FIG. 5 illustrates an exemplary method for detecting LED flickers and moving objects within HDR imagery, according to some embodiments of this specification. The steps 510-530 illustrated in FIG. 5 are for illustration purposes. Depending on the implementation, the method 500 may include fewer, more, or alternative steps.

In some embodiments, step 510 may include capturing a plurality of frames of a scene using a spatially multiplexed image sensor, wherein the spatially multiplexed image sensor includes a plurality of pixel groups, each pixel group includes a plurality of pixels with a plurality of different exposure settings, and the plurality of frames respectively corresponds to a plurality of different exposure settings. In some embodiments, the plurality of different exposure settings correspond to linearly increased exposure times by a predetermined factor.

In some embodiments, step 520 may include obtaining a plurality of vectors of pixel intensities respectively from the plurality of frames, each of the plurality of vectors of pixel intensities corresponding to a cluster of pixels in one of the plurality of frames.

In some embodiments, step 530 may include generating an intensity-changing pattern for the cluster of pixels across the plurality of frames based on the plurality of vectors of pixel intensities. In some embodiments, the generating the intensity-changing pattern for the cluster of pixels across the plurality of frames based on the plurality of vectors of pixel intensities includes: performing pixel intensity alignment among the plurality of vectors of pixel intensities by using the predetermined factor, thereby obtaining a plurality of vectors of aligned pixel intensities. In some embodiments, the performing pixel intensity alignment among the plurality of vectors of pixel intensities by using the predetermined factor includes: for a first vector of pixel intensities corresponding to a shorter exposure setting, enhancing the first vector of pixel intensities by the predetermined factor to align with a second vector of pixel intensities corresponding to a longer exposure setting.

In some embodiments, the generating the intensity-changing pattern for the cluster of pixels across the plurality of frames based on the plurality of vectors of pixel intensities further includes: applying a plurality of low pass filters (LPFs) to the plurality of vectors of aligned pixel intensities and the plurality of vectors of pixel intensities to quantify pixel intensity changes among the plurality of frames; and determining the intensity-changing pattern based on the quantified pixel intensity changes among the plurality of frames. In some embodiments, the plurality of LPFs have linearly increased window sizes.

In some embodiments, step 540 may include determining, based on the intensity-changing pattern, whether the cluster of pixels captures a moving object or an LED light source. In some embodiments, the determining whether the cluster of pixels capture a moving object or an LED light source based on the intensity-changing pattern includes: in response to the intensity-changing pattern indicating a gradual changing pattern, determining that the cluster of pixels capture the moving object; and in response to the intensity-changing pattern indicating a fluctuating pattern, determining that the cluster of pixels capture the LED light source.

In some embodiments, the determining whether the cluster of pixels capture a moving object or an LED light source based on the determined intensity-changing pattern includes: generating a motion amount based on the determined intensity-changing pattern; in response to the motion amount being greater than a first threshold, determining that the cluster of pixels capture the LED light source; and in response to the motion amount being smaller than a second threshold, determining that the cluster of pixels capture the moving object.

In some embodiments, the method 500 may further include: in response to determining that the cluster of pixels capture the LED light source, performing LFM on the cluster of pixels across the plurality of frames; and in response to determining that the cluster of pixels capture the moving object, performing HDR fusion on the cluster of pixels across the plurality of frames. In some embodiments, the performing LFM on the cluster of pixels across the plurality of frames includes: for the cluster of pixels, adopting corresponding pixel intensities captured using a longest exposure time in the plurality of different exposure settings.

In some embodiments, the method 500 may further include: in response to the motion amount being between the first threshold and the second threshold, performing partial LFM and partial HDR fusion on the cluster of pixels across the plurality of frames.

Figure 6:
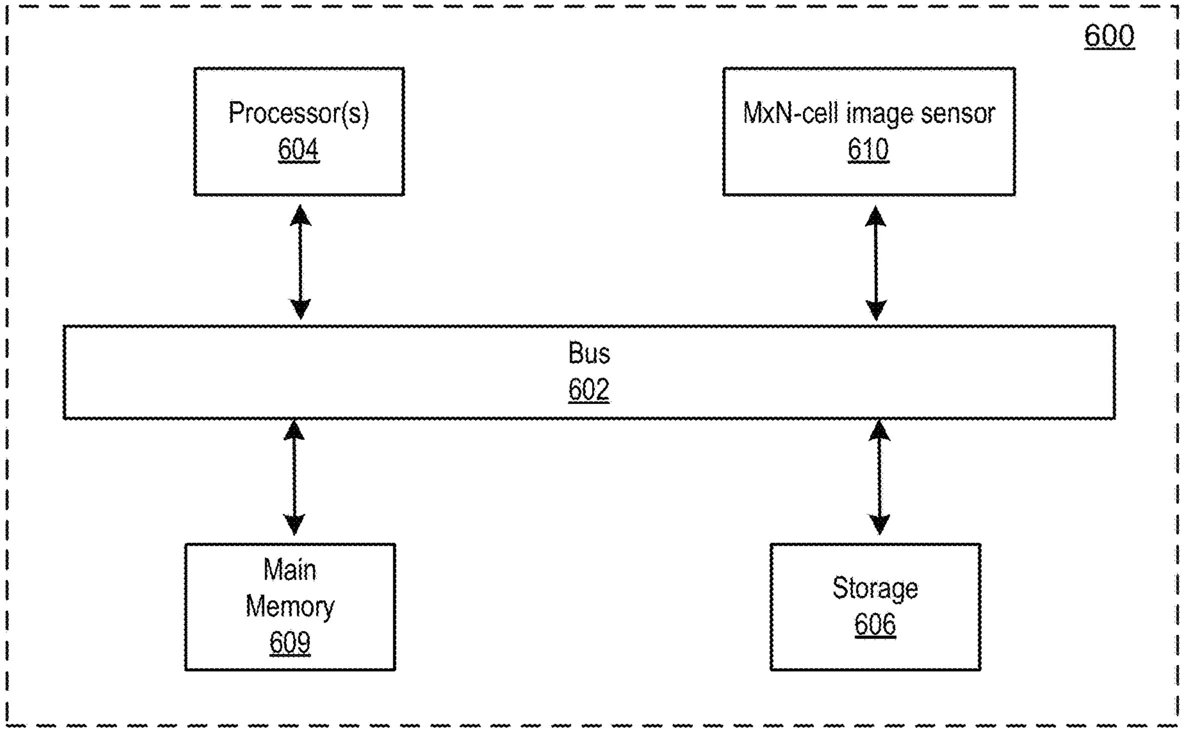
FIG. 6 is a schematic diagram of an example computing system for detecting LED flickers and moving objects within HDR imagery, according to some embodiments of this specification.

FIG. 6 is a schematic diagram of an example computing system for detecting LED flickers and moving objects within HDR imagery, according to some embodiments of this specification. The computer system 600 may be implemented in any of the components of the systems illustrated in FIG. 1A-5. One or more of the example methods illustrated by FIGS. 1A-5 may be performed by one or more implementations of the computer system 600.

The computer system 600 may include a bus 602 or another communication mechanism for communicating information, and one or more hardware processor(s) 604 coupled with bus 602 for processing information. Hardware processor(s) 604 may be, for example, one or more general purpose microprocessors.

The computer system 600 may also include a main memory 609, such as a random-access memory (RAM), non-transitory computer-readable memory, cache and/or other dynamic storage devices, coupled to bus 602 for storing information and instructions executable by processor(s) 604. Main memory 609 also may be used for storing temporary variables or other intermediate information during execution of instructions by processor(s) 604. Such instructions, when stored in storage media accessible to processor(s) 604, render computer system 600 into a special-purpose machine that is customized to perform the operations specified in the instructions. The computer system 600 may further include a read only memory (ROM) 609 or other static storage device coupled to bus 602 for storing static information and instructions for processor(s) 604. A storage device 606, such as a magnetic disk, optical disk, or USB thumb drive (flash drive), etc., may be provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 609. Such instructions may be read into main memory 609 from another storage medium, such as storage device 606. Execution of the sequences of instructions contained in main memory 609 may cause processor(s) 604 to perform the process steps described herein. In alternative embodiments, hard-wired circuitry may be used in place of or in combination with software instructions.

The main memory 609, the ROM 609, and/or the storage device 606 may include non-transitory storage media. The term "non-transitory media," and similar terms, as used herein refers to media that stores data and/or instructions that cause a machine to operate in a specific fashion, which excludes transitory signals. Such non-transitory media may comprise non-volatile media and/or volatile media. Non-volatile media includes, for example, optical or magnetic disks, such as storage device 606. Volatile media includes dynamic memory, such as main memory 609. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 may include a M×N-cell image sensor 610 (or generally called spatially multiplexed image sensor) coupled to bus 602. The M×N-cell image sensor 610 may include a plurality of pixel groups, each pixel group having a M×N pixels configured with color filters of a same color such that the M×N pixels in each pixel group capture a same color.

The computer system 600 can send messages and receive data, including program code, through the network(s), network link, and M×N-cell image sensor 610. In the Internet example, a server might transmit a requested code for an application program through the Internet, the ISP, the local network, and the M×N-cell image sensor 610.

The received code may be executed by processor(s) 604 as it is received, and/or stored in storage device 606, or other non-volatile storage for later execution.

Each process, method, and algorithm described in the preceding sections may be embodied in, and fully or partially automated by, code modules executed by one or more computer systems or computer processors comprising computer hardware. The processes and algorithms may be implemented partially or wholly in the application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions that cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted or executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. An image processing method to distinguish moving objects from Light-Emitting Diode (LED) flickers in an image based on pixel intensity-changing patterns, the method comprising:

capturing a plurality of frames of a scene using a spatially multiplexed image sensor, wherein the spatially multiplexed image sensor comprises a plurality of pixel groups, each pixel group comprises a plurality of pixels with a plurality of different exposure settings, and the plurality of frames respectively corresponds to a plurality of different exposure settings;

obtaining a plurality of vectors of pixel intensities respectively from the plurality of frames, each of the plurality of vectors of pixel intensities corresponding to a cluster of pixels in one of the plurality of frames;

generating an intensity-changing pattern for the cluster of pixels across the plurality of frames based on the plurality of vectors of pixel intensities; and determining, based on the intensity-changing pattern, whether the cluster of pixels captures a moving object or an LED light source, wherein the determining comprises:

in response to the intensity-changing pattern indicating a gradual changing pattern, determining that the cluster of pixels capture the moving object; and in response to the intensity-changing pattern indicating a fluctuating pattern, determining that the cluster of pixels capture the LED light source.

2. The image processing method of claim 1, wherein the plurality of different exposure settings correspond to linearly increased exposure times by a predetermined factor.

3. The image processing method of claim 2, wherein the generating the intensity-changing pattern for the cluster of pixels across the plurality of frames based on the plurality of vectors of pixel intensities comprises:

performing pixel intensity alignment among the plurality of vectors of pixel intensities by using the predetermined factor, thereby obtaining a plurality of vectors of aligned pixel intensities.

4. The image processing method of claim 3, wherein the performing pixel intensity alignment among the plurality of vectors of pixel intensities by using the predetermined factor comprises:

for a first vector of pixel intensities corresponding to a shorter exposure setting, enhancing the first vector of pixel intensities by the predetermined factor to align with a second vector of pixel intensities corresponding to a longer exposure setting.

5. The image processing method of claim 3, wherein the generating the intensity-changing pattern for the cluster of pixels across the plurality of frames based on the plurality of vectors of pixel intensities further comprises:

applying a plurality of low pass filters (LPFs) to the plurality of vectors of aligned pixel intensities and the plurality of vectors of pixel intensities to quantify pixel intensity changes among the plurality of frames; and determining the intensity-changing pattern based on the quantified pixel intensity changes among the plurality of frames.

6. The image processing method of claim 5, wherein the plurality of LPFs have linearly increased window sizes.

7. The image processing method of claim 1, wherein the determining whether the cluster of pixels capture a moving object or an LED light source based on the determined intensity-changing pattern further comprises:

generating a motion amount based on the determined intensity-changing pattern;

in response to the motion amount being greater than a first threshold, determining that the cluster of pixels capture the LED light source; and in response to the motion amount being smaller than a second threshold, determining that the cluster of pixels capture the moving object.

8. The image processing method of claim 7, the method further comprising:

in response to determining that the cluster of pixels capture the LED light source, performing LED Flicker Mitigation (LFM) on the cluster of pixels across the plurality of frames; and in response to determining that the cluster of pixels capture the moving object, performing High Dynamic Range (HDR) fusion on the cluster of pixels across the plurality of frames.

9. The image processing method of claim 8, wherein the performing LFM on the cluster of pixels across the plurality of frames comprises:

for the cluster of pixels, adopting corresponding pixel intensities captured using a longest exposure time in the plurality of different exposure settings.

10. The image processing method of claim 7, the method further comprising:

in response to the motion amount being between the first threshold and the second threshold, performing partial LFM and partial HDR fusion on the cluster of pixels across the plurality of frames.

11. A system associated with a spatially multiplexed image sensor, comprising one or more processors and one or more non-transitory computer-readable memories coupled to the one or more processors and configured with instructions executable by the one or more processors to cause the system to perform operations comprising:

capturing a plurality of frames of a scene using the spatially multiplexed image sensor, wherein the spatially multiplexed image sensor comprises a plurality of pixel groups, each pixel group comprises a plurality of pixels with a plurality of different exposure settings, and the plurality of frames respectively corresponds to a plurality of different exposure settings;

obtaining a plurality of vectors of pixel intensities respectively from the plurality of frames, each of the plurality of vectors of pixel intensities corresponding to a cluster of pixels in one of the plurality of frames;

generating an intensity-changing pattern for the cluster of pixels across the plurality of frames based on the plurality of vectors of pixel intensities; and determining, based on the intensity-changing pattern, whether the cluster of pixels captures a moving object or an LED light source, wherein the determining comprises:

in response to the intensity-changing pattern indicating a gradual changing pattern, determining that the cluster of pixels capture the moving object; and in response to the intensity-changing pattern indicating a fluctuating pattern, determining that the cluster of pixels capture the LED light source.

12. The system of claim 11, wherein the plurality of different exposure settings correspond to linearly increased exposure times by a predetermined factor.

13. The system of claim 12, wherein the generating the intensity-changing pattern for the cluster of pixels across the plurality of frames based on the plurality of vectors of pixel intensities comprises:

performing pixel intensity alignment among the plurality of vectors of pixel intensities by using the predetermined factor, thereby obtaining a plurality of vectors of aligned pixel intensities.

14. The system of claim 13, wherein the performing pixel intensity alignment among the plurality of vectors of pixel intensities by using the predetermined factor comprises:

for a first vector of pixel intensities corresponding to a shorter exposure setting, enhancing the first vector of pixel intensities by the predetermined factor to align with a second vector of pixel intensities corresponding to a longer exposure setting.

15. The system of claim 13, wherein the generating the intensity-changing pattern for the cluster of pixels across the plurality of frames based on the plurality of vectors of pixel intensities further comprises:

applying a plurality of low pass filters (LPFs) to the plurality of vectors of aligned pixel intensities and the plurality of vectors of pixel intensities to quantify pixel intensity changes among the plurality of frames; and determining the intensity-changing pattern based on the quantified pixel intensity changes among the plurality of frames.

16. The system of claim 11, wherein the determining whether the cluster of pixels capture a moving object or an LED light source based on the determined intensity-changing pattern further comprises:

generating a motion amount based on the determined intensity-changing pattern;

in response to the motion amount being greater than a first threshold, determining that the cluster of pixels capture the LED light source; and in response to the motion amount being smaller than a second threshold, determining that the cluster of pixels capture the moving object.

17. The system of claim 16, wherein the operations further comprise:

in response to determining that the cluster of pixels capture the LED light source, performing LFM on the cluster of pixels across the plurality of frames; and in response to determining that the cluster of pixels capture the moving object, performing HDR fusion on the cluster of pixels across the plurality of frames.

18. A non-transitory computer-readable storage medium associated with a spatially multiplexed image sensor, the non-transitory computer-readable storage medium configured with instructions executable by one or more processors to cause the one or more processors to perform operations comprising:

capturing a plurality of frames of a scene using the spatially multiplexed image sensor, wherein the spatially multiplexed image sensor comprises a plurality of pixel groups, each pixel group comprises a plurality of pixels with a plurality of different exposure settings, and the plurality of frames respectively corresponds to a plurality of different exposure settings;

obtaining a plurality of vectors of pixel intensities respectively from the plurality of frames, each of the plurality of vectors of pixel intensities corresponding to a cluster of pixels in one of the plurality of frames;

generating an intensity-changing pattern for the cluster of pixels across the plurality of frames based on the plurality of vectors of pixel intensities; and determining, based on the intensity-changing pattern, whether the cluster of pixels captures a moving object or an LED light source, wherein the determining comprises:

generating a motion amount based on the determined intensity-changing pattern;

in response to the motion amount being greater than a first threshold, determining that the cluster of pixels capture the LED light source; and in response to the motion amount being smaller than a second threshold, determining that the cluster of pixels capture the moving object.

* * * * *